United States Patent [19]
Batter, Jr.

[11] 4,023,194
[45] May 10, 1977

[54] PHOTOGRAPHIC SYSTEM EMPLOYING A CASSETTE CARRYING A PROCESSING INDICATOR

[75] Inventor: John F. Batter, Jr., Lincoln, Mass.

[73] Assignee: Polaroid Corporation, Cambridge, Mass.

[22] Filed: May 6, 1974

[21] Appl. No.: 467,266

Related U.S. Application Data

[63] Continuation of Ser. No. 319,487, Dec. 29, 1972, abandoned.

[52] U.S. Cl. .............................. 354/317; 352/78 C; 352/130
[51] Int. Cl.² .......................................... G03D 5/00
[58] Field of Search ............ 354/297, 317; 352/72, 352/78 R, 78 C, 130

[56] References Cited

UNITED STATES PATENTS

| | | | |
|---|---|---|---|
| 2,493,928 | 1/1950 | Rath | 352/78 C X |
| 3,617,013 | 11/1971 | Ainslie et al. | 352/78 R X |
| 3,623,417 | 11/1971 | Eloranta et al. | 352/72 X |
| 3,672,752 | 6/1972 | Young et al. | 352/72 |
| 3,771,861 | 11/1973 | Land | 352/130 |
| 3,778,140 | 12/1973 | Land | 352/130 |
| 3,832,048 | 8/1974 | Batter et al. | 354/317 X |

FOREIGN PATENTS OR APPLICATIONS 1,222,370  8/1966  Germany .......................... 352/78 C

*Primary Examiner*—Fred L. Braun
*Attorney, Agent, or Firm*—David R. Thornton

[57] ABSTRACT

A film handling cassette and apparatus configured for operation of the same through any one of several processing cycles and subsequent projection of the film retained within the cassette. The cassette includes structure indicative of the processing cycle required for the particular film retained within the cassette, and the apparatus includes a sensor configured to cooperate with the indicative structure and to program the apparatus responsive thereto so as to operate the cassette through a selected processing cycle which conforms to the required cycle. In the illustrated embodiment, the cassette includes a rib-like tactile discontinuity carried on the cassette surface which in conjunction with a complementary indent of the apparatus prevents loading of the cassette except when it is oriented in one special relation to the apparatus, and the rib length or, more particularly, the location of the end of the rib is made to be indicative of the required processing program.

9 Claims, 5 Drawing Figures

PHOTOGRAPHIC SYSTEM EMPLOYING A CASSETTE CARRYING A PROCESSING INDICATOR

CROSS REFERENCE TO RELATED APPLICATIONS

This is a continuation of application Ser. No. 319,487, filed Dec. 29, 1972 and now abandoned.

BACKGROUND OF THE INVENTION

1. Field of the Invention

This invention relates to photographic systems and more particularly to an improved photographic system including a film cassette and apparatus for use with the same which is configured to operate the cassette through a selected processing program.

2. Description of the Prior Art

In the photographic arts, and particularly in motion picture systems with which the invention is primarily concerned, continuing improvements have been made in recent years to provide simplified, substantially automatic systems suitable for use by the non-professional. In this regard, systems have now been developed which permit the individual to effect processing and projection of motion picture film immediately following the exposure operation. Exemplary of this development are systems described in prior U.S. Pat. No. 3,615,127 of Edwin H. Land issued Oct. 26, 1971; Pat. No. 3,623,417 of Vaito K. Eloranta, et al issued Nov. 30, 1971; and the commonly assigned copending patent application Ser. No. 227,092 of John F. Batter, Jr., et al filed on Feb. 17, 1972, now U.S. Pat. No. 3,785,725; and Ser. No. 227,080 of Edwin H. Land filed on Feb. 17, 1972, now U.S. Pat. No. 3,800,306.

As particularly noted in copending application Ser. No. 227,080 a film cassette system has been developed in which, following exposure, the cassette may be inserted within appropriate projector apparatus which automatically operates the cassette through a processing cycle and a subsequent projection cycle. In response to the insertion of a cassette containing unprocessed film, the processing and projecting apparatus manipulate the cassette and its film so as to develop the latter to produce a series of projectable images, and thereafter project the images for viewing. Finally, the film is rewound within the cassette for storage and subsequent reuse.

In the arrangement described in application Ser. No. 227,080, the apparatus initially operates the cassette to release a retained fluid within an applicator for deposition of the latter on the film strip. Following release of the fluid, the movement of the film is interrupted for a short interval of time to allow the processing composition to find its way to a coating nozzle. Thereafter, the film is continuously rewound from a take-up reel, on which most of the strip is coiled responsive to exposure operations, onto a supply reel at constant linear speed (relative to the coating nozzle) while the processing composition is applied in a thin uniform coat. At the completion of this rewind operation, the film motion is again interrupted for a sufficient length of time to permit imbibition of the developing fluid into the most recently coated portions of the film. Following this imbibition period, the film is driven forwardly from the supply reel to the take-up reel and illumination is directed through the film and a lens system so as to project film images to a screen which forms part of the projector apparatus.

The above described system is quite satisfactory for processing of a cassette having a film and processing arrangement designed specifically for the processing program of the apparatus, that is, designed for processing with the fixed speed of film advancement and the timed interruptions of the processing cycle. However, where cassettes having different types of film which require different processing programs, are employed it is desirable to vary the program so as to operate the cassette through a processing cycle designed specifically for that particular film.

Consequently, it is a primary object of this invention to provide an improved film handling cassette and apparatus for operating the same.

It is another primary object of this invention to provide a film handling cassette adapted for operation through a processing cycle appropriate for the film retained within the cassette.

Still another object of this invention is to provide a processor apparatus having a plurality of different processing programs.

A further object of this invention is to provide improved photographic apparatus for substantially automatically operating a film handling cassette through a selected film processing program suitable for the particular cassette.

SUMMARY OF THE INVENTION

The invention is broadly directed to a film handling cassette having film of a type requiring a predetermined processing program, and the apparatus is configured for processing the film carried within the latter in accordance with one of a plurality of processing programs. The cassette includes means for indicating the particular processing program required for its photographic film and the apparatus includes means for sensing the indication of the cassette so as to automatically select the appropriate program.

In its illustrated embodiment, the cassette includes a parallelepiped-like housing having a pair of guide ribs along one side thereof which are configured to cooperate with complementary structure of a processor and projector apparatus for orienting the cassette in the receiving means of the former. The length of one guide rib or, that is, the discontinuity formed by an end thereof provides means indicating the processing program required for that particular cassette. Further, the apparatus includes means for sensing the location of this end of the guide rib and for appropriately varying the processing program or selecting one of several programs in accordance therewith.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
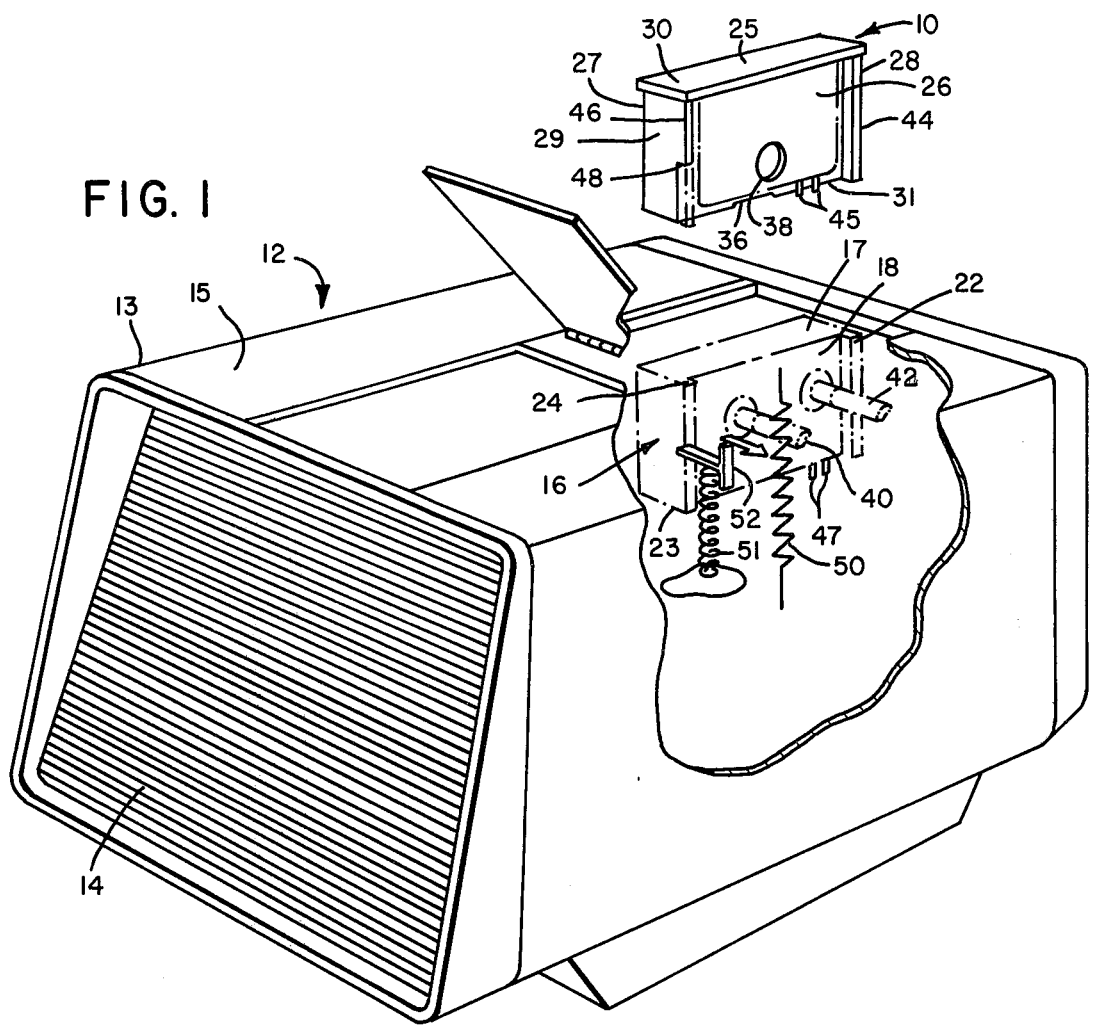
FIG. 1 is a diagrammatic view in perspective of a motion picture film handling cassette and motion picture viewer embodying the features of this invention.

The illustrated embodiment of this invention employs a multipurpose film handling cassette and a viewer apparatus of the type described in the aforementioned patent applications which provide for exposure, chemical processing, drying and projection of the recorded images without transferring the film from the cassette. Hence, in the illustrated embodiment of this invention, which may be best understood by first referring to FIG. 1 of the drawing, a multipurpose film handling cassette 10 is shown in conjunction with the projector apparatus 12, both of which are of the above-noted type.

The projector 12 is illustrated as a rear projection viewer comprising a box-like housing 13 defined in part by a front viewing screen 14. Positioned rearwardly of the screen 14 in adjoining relation to the top surface 15 of the housing 13 is a cassette-receiving slot or well 16 which extends to and is in communication with the top surface. As later described in detail with respect to the cassette 10, the open top 17 of the well is configured to conform to the cassette body and includes in its side wall 18, a pair of channels or indents 22 and 24 which extend toward the bottom 23 of the well and are employed to guide the cassette to its operative location.

Before proceeding further with the detailed description, it should be understood that the term "projector" is used herein in a comprehensive sense, i.e. to broadly refer to systems wherein the visible image recorded on a sheet of material is re-imaged for viewing purposes and is not restricted to rear projection viewer systems in which the recorded visible image is projected within a compact housing onto the rear of a front viewing screen.

The cassette 10, which as previously indicated is a multipurpose motion picture film cassette, comprises a generally parallelepiped casing or housing 25 formed, for example, of molded plastic and made up of planar faces or side walls 26 and 27, end walls 28 and 29 and elongated top and bottom edge walls 30 and 31.

In this embodiment, the end walls 28 and 29 extend outwardly from side wall 26 and essentially form elongated ribs 44 and 46 on this side wall which are configured to cooperate with the indents 22 and 24 respectively, of the cassette-receiving well 16 so as to thereby guide the cassette 10 to its operative location and in conjunction with the top surface 30 of the cassette as noted in the copending patent application Ser. No. 207,257 of James M. Conner et al. filed on Dec. 13, 1971 now U.S. Pat. No. 3,751,145 prevent insertion of the cassette in the well except when the former is oriented in one given spacial relation as shown in FIG. 1. As will be subsequently explained in more detail with regards to FIG. 2, the rib 46 is varied in length so that its end 48 provides a tactile discontinuity whose location with respect to the bottom 31 of the cassette is related to the type of film and/or the processing cycle suitable for the particular film carried in the cassette. Hence, in this embodiment, rib 46 and its end 48 provide means indicating the processing cycle suitable for that cassette.

Figure 2:
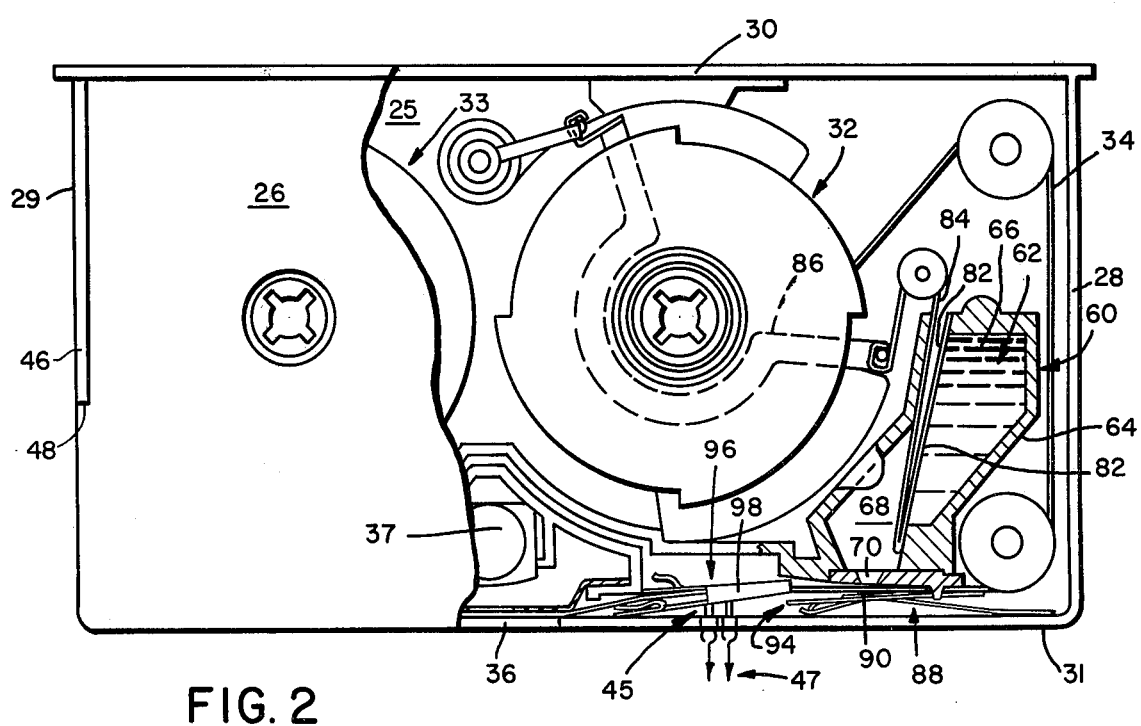
FIG. 2 is a view of the cassette of FIG. 1 with a portion of its cover cut away to show some of the component elements retained therein.

Referring now to the interior of the cassette, some of the components of which are shown in FIG. 2, it is to be noted that a photographic film strip 34 is initially (in its photosensitive state) mostly coiled on and permanently attached at one of its ends (not shown) to a rotatable supply spool or reel 32 from which it extends within the casing 25 in a somewhat extended path to a take-up spool or reel 33 to which the opposite end of the film is attached.

In its path within the casing 25, the film 34 extends across an opening 36 of the bottom edge 31 of the casing. This opening 36 functions at different times to facilitate both exposure and projection. Hence, in accordance with the aforementioned, copending patent applications, the opening 36 serves to provide the cassette 10 with a film exposure station where progressive incremental sections of the film strip 34 may be exposed to image-carrying light rays when the cassette is mounted in an appropriate camera (not shown), and a film projection station where light rays from a projection illumination system (not shown) may be directed through progressive incremental sections of the film strip when the cassette is mounted in the projector 12. For the projection operation, a prism 37 may be mounted behind the film strip in an adjoining relation to both the opening 36 and an illumination aperture 38 (see FIG. 1) of side wall 26 so as to facilitate film illumination.

In its path from the supply spool 32, the film 34 first passes through a film processing station 60 which in addition to the apparatus for processing the film in a manner to be described, also comprises a signal generator for producing an external condition signal on terminals designated as 45 to indicate whether or not the processing means has been actuated. Beyond the film processing station 60, the film 34 extends across the opening 36 and onto the take-up spool 33.

The film processing station 60, fragmentarily shown in FIG. 2, generally comprises a housing 64 retaining a source of processing fluid or composition 66 within a sealed container 62. Included within the housing 64 is a chamber 68 in communication with a coating nozzle or orifice generally designated 70. These elements are mounted above the plane of the film 34.

The initially sealed container 62 comprises a tub-like receptacle of a suitable plastic or the like which is sealed (to initially contain the processing composition 66) by one end 82 of a tear-tab generally designated 84. As described in the aforementioned application Serial No. 227,092, the tab 84 extends from the processor housing 64 to an actuating arm 86 which upon rewind of the film, following insertion of the cassette in the viewer, tears the tab from its sealing position to release the fluid 66 into chamber 68 from whence it flows to the nozzle 70.

Included within the processing apparatus 60 is a pressure pad assembly 88, shown in the initial position assumed upon assembly of the cassette and prior to processing of the film strip 34. As shown in this figure, the film 34 normally passes below the nozzle 70, and above a normally disengaged film engaging pad surface 90 of the assembly 88.

Displaceably mounted in conjunction with one end 94 of the pad assembly 88 is a nozzle closure plate or slidevalve assembly 96 which is configured to engage the film 34 and to be displaced therewith so as to close the nozzle 70 at the end of the processing operation.

A side portion 98 of the assembly 96 is of metallic conducting material and is adapted to cooperate with the contacts or terminals 45 which extend to the cassette's outer surface as illustrated in FIG. 1. These terminals 45 of the cassette 10 together with the valve 96 form a signal generator, or that is, means for indicating whether or not the film strip 34 has been processed. For this purpose, in the initial position of the parts shown in FIG. 2, assumed before the processing cycle is started, the side portion 98 of the closure plate 96 bridges both contacts so as to supply continuity therebetween and thus an external signal which indicates by their bridged condition that the film is not processed. At the end of the processing cycle, the valve assembly 96 will be carried to the right (not shown) thereby opening the contacts 45 to cause an open circuit to be presented to the viewer terminals 47, indicating that the film has been processed. Further, as later explained, the indicating means provided by contacts 45 and valve 96 are utilized to control the programmed sequence in the projector 12.

The film 34 comprises a base of any suitable transparent material of the kind conventionally used for film bases. On this base an emulsion is applied which comprises a photosensitive coating, whereon a series of latent images may be formed with a suitable camera. The photosensitive coating is preferably of one of the forms, next to be described, which can subsequently be processed to form a projectable image on the film base.

Photosensitive coatings usable in the practice of the invention may be of any conventional variety adapted to be developed by a monobath processing composition to form a positive transparency suitable for projection. In particular, a currently preferred embodiment of the invention makes use of a film structure, which, upon the base, comprises a photosensitive layer including both a photosensitive negative emulsion and an image-receiving layer to which a positive image may be transferred by diffusion during development without necessitating the subsequent removal of the emulsion containing its developed negative image.

A composite film assembly of this type, as well as processing compositions for producing a fully developed black and white image without the necessity of removing the developed negative image after processing, are shown in prior U.S. Pat. No. 2,861,885 of Edwin H. Land, which issued on Nov. 25, 1958, for Photographic Processes And Products. Other composite film assemblies capable of producing developed full color images without the necessity of removing the developed emulsion are shown in prior U.S. Pat. Nos. 2,726,154 of Edwin H. Land issued Dec. 6, 1955 for Photographic Product, and 2,944,894 issued July 12, 1960 for Photographic Processes Utilizing Screen Members.

Since it is desirable to make a variety of compatible film handling cassettes available to the customer, for instance, cassettes having black and white, or color film, and having film of different film speeds, it would be appropriate to provide slightly different processing programs. That is while each cassette will carry its own processing fluid and applicator etc., designed for the particular film retained within the cassette, it is advantageous to at least slightly vary the processing program to accommodate the different cassettes. For instance, rather than provide cassettes of different film types having precisely the same processing program, it is more economical to provide cassettes, which while compatible, require slightly different processing programs. Hence, in the novel system, the time interval of each interruption of the film advance during processing and the film advance speed are varied in accordance with the type of cassette so as to accommodate different imbibition requirements and to permit wider latitude in the design of the cassette processing station. In the latter case, this permits wider choice of processing compositions and different viscosity thereof. Consequently, as previously indicated, the cassette of the illustrated embodiment carries means for indicating the desired processing cycle, and in keeping with this, the viewer apparatus includes means for sensing the indication of the cassette and for varying the processing program accordingly.

Prior to a discussion of these novel sensing arrangements, the viewer apparatus will be described in more detail. In this embodiment, the cassette 10 is arranged for processing and projection operations within the well 16 with its projection station opening 36 in registration with an aperture plate (not shown) of the bottom 23 of the well, and its illumination aperture 38 located in alignment with a conventional projection lamp (not shown). During projection, the latter is configured to direct illumination into the cassette and then outwardly through incremental segments of the film 34 as such segments are progressively advanced across the opening 36. As shown in FIG. 1, for driving the film reels 32 and 33, a pair of drive spindles 40 and 42 are mounted alongside the well 16 for displacement into engagement with the respective reels once the cassette is properly located in the apparatus. Mounted beneath the cassette-receiving well 16 are conventional projector components (not shown) such as a claw mechanism, a suitable rotary shutter, and a projection lens assembly. The latter being configured to transmit the image bearing illumination emanating from the opening 36 and focus it in the plane of transparent screen 14.

Figure 3:
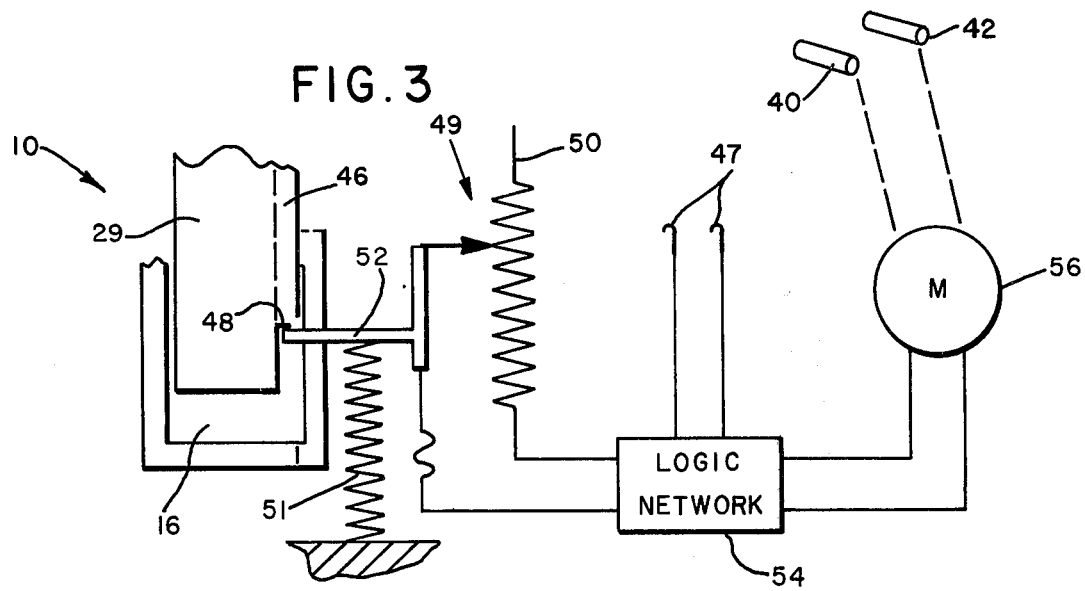
FIG. 3 is a diagrammatic view further illustrating some of the operational elements of the apparatus shown in FIG. 1.

Also located near the bottom 23 of the well 16 in position to cooperate with the cassette contacts 45 are the viewer terminals 47 which automatically control the overall program of the viewer. The latter is accomplished in conjunction with a logic network 54, shown in FIG. 3 which controls the operation of the drive spindles 40 and 42 through a motor 56, as well as other pertinent elements (not shown).

As previously indicated, the length of rib 46 is employed in this embodiment to indicate the type of film and the processing program required for that particular cassette. Accordingly, as shown in detail in FIG. 2, the viewer 12 includes means for sensing the length of the rib 46 or, that is, the location of the tactile discontinuity 48 provided by the end of this rib so as to program the viewer through a selected processing operation which will be compatible with the inserted cassette. In the illustrated embodiment, the sensing means includes a potentiometer-like element 49 which includes a resistor portion 50 and a displaceable contact arm 52. The latter, biased upwardly by a spring member 51, extends within the well 16 so as to be contacted by the rib end 48 and be displaced downwardly in accordance with the length of the rib 46, or that is, in accordance with the position of this end 48 with respect to the seated position of the cassette in the viewer. The contact arm 52 is coupled to the logic network 54 which, as previously noted, controls the drive motor 56 and other pertinent elements (not shown) of the viewer apparatus so that the viewer and its processing program are responsive to the program indicating means of the cassette.

Figure 4:
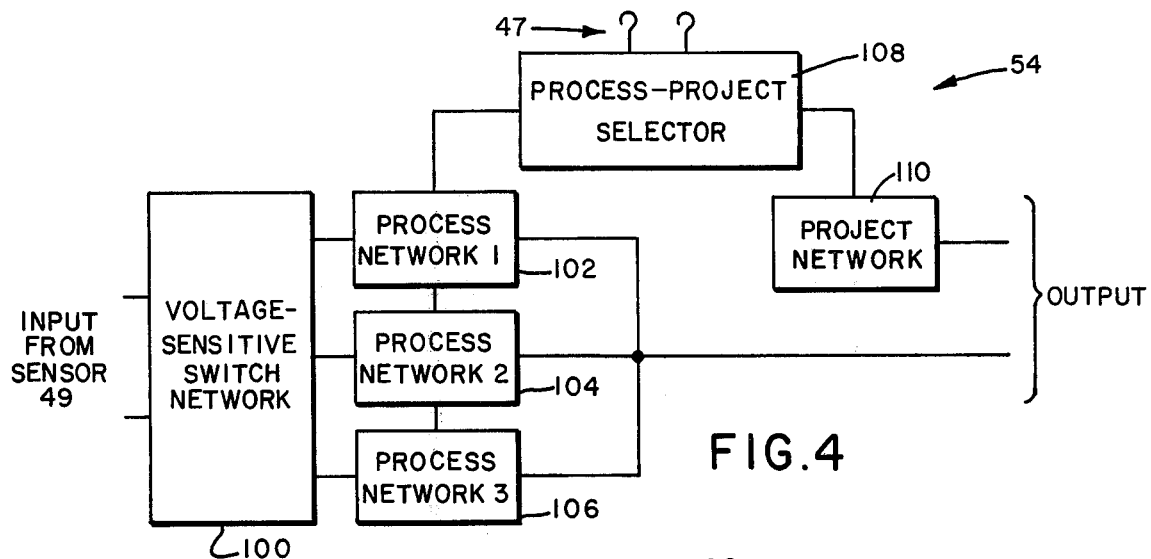
FIG. 4 is a block diagram of the logic network shown in FIG. 3.

In this regard, network 54 may be adapted to vary the motor input, for instance, vary its speed and stop and start it to interrupt processing responsive to the voltage output from potentiometer 49. As shown in FIG. 4, the network 54 may include a voltage sensitive switching circuit 100 coupled to a plurality of processing networks 102, 104 and 106 each switched into operation in accordance with the sensing means 49 and each providing a different processing program, including different interruption intervals or motor speed, etc. Hence, it should be understood that the network 54 and the motor 56 with its drive spindles 40 and 42 provide means for operating the cassette through any of a number of different processing programs and the potentiometer 49 provides means for controlling this operative means so as to select a predetermined program.

As noted previously, terminals 47 are also coupled to the logic network 54, and hence, the viewer 12 initially determines whether the cassette is processed or unprocessed by means of this network in accordance with the conductivity of the contact elements 45. As shown in FIG. 4, the terminals 47 are coupled to a process-project selector 108 which, in turn, permits operation of the processing networks 102, 104 and 106 in accordance with circuit 100 or switches off the latter and turns on a project network 110. Assuming that the cassette is unprocessed, the logic network 54 then actuates the viewer to program the cassette sequentially through a processing and a projection program, that is, turns on the process networks and then the projection network. At this time, the logic network 54 also receives a signal from the potentiometer 49 which, in turn, cooperates with the logic network 54 to select a particular processing program, or otherwise modify the processing program to make it appropriate to the particular cassette, that is, control the network 54 so as to provide different film advance speeds, different delay times or combinations of these. In this arrangement, the delays would be adapted to accommodate the different time intervals necessary for fluid flow to the nozzle area of the cassette processor and to provide a selected imbibition period.

Many different arrangements of the process cycle indicator and sensing device could be employed. For instance, the tactile discontinuity need not be combined with or formed on the guide rib but may be separately provided as a raised or indented portion of any appropriate surface of the cassette. Further, this indicator may provide an electrical signal. That is, it may comprise a cassette network having contacts or other means configured to cooperate with sensing means of the viewer and so as to activate a particular processing cycle in accordance with the electrical state, e.g. the conductivity or capacitance or voltage, sensed by the viewer.

Figure 5:
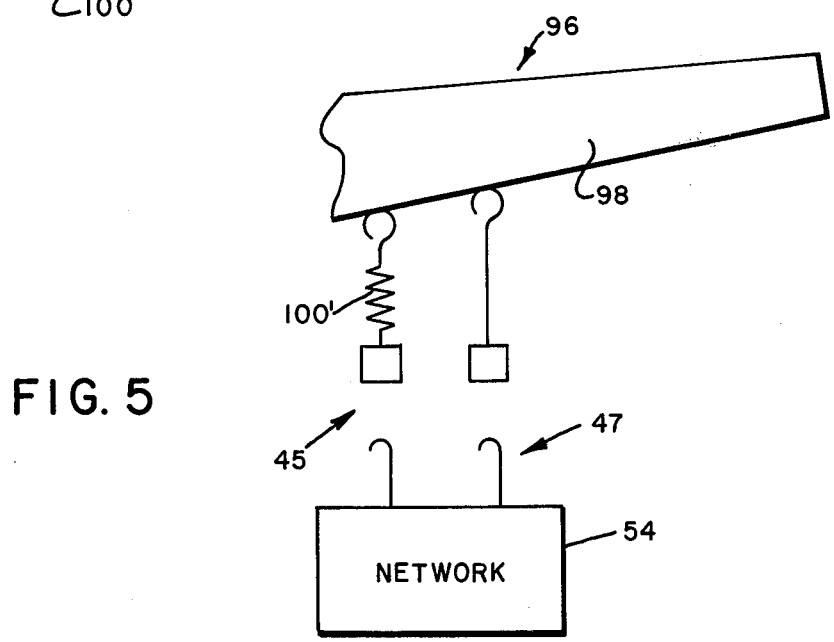
FIG. 5 is a partially schematic view illustrating another embodiment of the invention.

In an alternate embodiment, shown in FIG. 5, the means for indicating the required processing program is provided as an electrical means and is combined with the process-unprocess indicator 45. Hence, as shown in FIG. 5, a resistor element 100' is positioned between one of the contacts 45 and the side portion 98 of the slide valve 96. Hence, these together provide signal means for indicating to the viewer which of alternate programs, i.e. process and projection or projection alone, are to be employed and for selecting one of a number of processing programs for the process portion when the latter is indicated. For this arrangement, the network 54, shown in FIG. 4, may be modified, for example, by coupling selector 108 to the process networks 102, 104 and 106 through switch network 100.

It should be noted that while the illustrated cassette includes its own processing station, the latter could be provided within the apparatus 12 along with means for effecting an operative relationship between it and the cassette film strip. In such an arrangement, it would still be advantageous to vary the processing program in accordance with the particular film type, and the cassette rib or other indicator may be employed in the described manner to control the viewer apparatus.

Those familiar with the motion picture arts will readily appreciate the novel and highly unique advantages of this cassette system which provides substantially completely automatic operation of a multipurpose cassette in accordance with not only the processed and unprocessed condition of the film but also the film type. The cassette includes structure indicating the type of film and its processing cycle, and the apparatus automatically modifies the processing program or selects a particular program responsive to this cassette indication.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A photographic cassette for use with other apparatus which includes means for operating said cassette through a first and alternately a second fluid treatment program for treating with processing fluid photographic film retained within said cassette, control means responsive to a cassette indicator for controlling such other apparatus to operate said cassette through one of such first and second programs, a slot-like receiving means configured for receiving said cassette in an operative location, and an indent located in one of the perimetric edges of such slot-like receiving means, said cassette comprising:

a housing retaining a strip of photographic film of a first or second type, said housing being configured to conform to said slot-like receiving means for slideable insertion therein, said housing including on an exterior surface thereof an elongated rib complementary to such indent and configured for guiding said cassette to an operative location in such other apparatus, said cassette rib varying in length from cassette to cassette, processing means within said housing for treating said film strip with processing fluid to develop said film strip to a viewable condition when said cassette is operated by said other apparatus in accordance with only one of such first or second fluid treatment programs, the length of said rib being indicative of said one fluid treatment program, and said rib being configured for cooperating with such control means to control such other apparatus to operate said cassette through said one program.

2. A photographic apparatus for use with a photographic film cassette, such cassette having a housing configured for retaining a strip of exposed film, processing means for treating such film with processing fluid so as to develop such film to a viewable condition when such cassette is operated in accordance with a given fluid treatment program, and means for indicating such given program, said apparatus comprising:

means for receiving such cassette;

means for operating such cassette through a first predetermined fluid treatment program and alternately through a second predetermined fluid treatment program differing from said first program, at least one of said first and second programs being in conformance with such given fluid treatment program; and means responsive to such indicating means when such cassette is received in said receiving means for selecting said one of said first or said second programs so as to operate such cassette through such given program.

3. A photographic apparatus for use with a photographic film cassette, such cassette having a housing configured for retaining a strip of exposed film, processing means for treating such film with processing fluid so as to develop such film to a viewable condition when such cassette is operated in accordance with a given fluid treatment program, and means for indicating such given program, such given program including treating progressive incremental sections of such film strip with processing fluid during advancement of such film strip at a given speed, said apparatus comprising:

means for receiving such cassette;

means for operating such cassette through a first predetermined fluid treatment program and alternately through a second predetermined fluid treatment program differing from said first predetermined program, said operating means including drive means configured for advancing such film strip and means for controlling said drive means so as to advance such film at a first predetermined speed during said first fluid treatment program and at a second predetermined speed during said second fluid treatment program, at least one of said predetermined speeds being in conformance with such given speed, and at least one of said first and second fluid treatment programs being in conformance with such given fluid treatment program and including advancing such film strip at such given speed; and means responsive to such indicating means when such cassette is received in said receiving means for selecting said one of said first or said second predetermined programs so as to operate such cassette through such given program.

4. A photographic apparatus for use with a photographic film cassette, such cassette having a housing configured for retaining a strip of exposed film, processing means for treating such film with processing fluid so as to develop such film to a viewable condition when such cassette is operated in accordance with a given fluid treatment program, and means for indicating such given fluid treatment program, such given fluid treatment program including treating progressive incremental sections of such film strip with processing fluid during advancement of such film strip and further including interruption for a given time interval of such advancement during such fluid treatment program, said apparatus comprising:

means for receiving such cassette;

means for operating such cassette through a first predetermined fluid treatment program and alternately through a second predetermined fluid treatment program differing from said first fluid treatment program, said operating means including drive means for advancing such film during said first and said second fluid treatment programs and means for controlling said drive means so as to provide an interruption for a first time interval during said first fluid treatment program and an interruption for a second time interval during said second fluid treatment program, at least one of said first or said second time intervals being in conformance with such given time interval, at least one of said first and second fluid treatment programs being in conformance with such given program and including said at least one of said first or said second time intervals; and means responsive to such indicating means when such cassette is received in said receiving means for selecting said one of said first or said second predetermined programs so as to operate such cassette through such given program.

5. Photographic apparatus for use with a cassette including a housing, a strip of photographic material, means for alternately cooperating with said apparatus for performing a plurality of operational programs comprising a predetermined fluid treatment program for treating of such strip of photographic material with processing fluid so as to provide viewable images on such strip and one of other operational program for projecting the images recorded on such strip of photographic material, and means for indicating to said apparatus said predetermined program and whether said predetermined program has been performed, such indicating means including a circuit having a first predetermined electrical condition indicative of said predetermined program and selectively operative means for altering such first condition to a second condition indicative that said predetermined program has been performed, said apparatus including a housing configured to operably receive such cassette, selectively operable means for operating such cassette through any of a plurality of fluid treatment programs including one fluid treatment program conforming to said predetermined program and for thereafter operating such cassette through said one other operational program for projecting images recorded on such strip, and control means adapted to be disposed in operative relation with such indicating means when such cassette is received in said apparatus for controlling said selectively operable means so as to perform only said one of said plurality of fluid treatment programs when such indicating means provides such first condition and to perform said one other operational program when such indicating means provides such second condition.

6. A photographic system comprising:
a photographic film cassette comprising:

a housing configured for retaining a strip of exposed film;

means for alternately cooperating with a projector apparatus for performing a plurality of operational programs comprising a predetermined fluid treatment program for treating such strip of photographic material with processing fluid to provide viewable images on such film strip and at least one other operational program for projecting images recorded on such strip;

means for indicating said predetermined program and whether said predetermined program has been performed, said indicating means including a pair of contacts configured to provide an open circuit when said predetermined program has been performed and to provide a closed circuit having a given electrical condition indicative of said predetermined program when said predetermined program has not been performed; and projector apparatus comprising:

means for operably receiving said cassette;

selectively operable means for performing any of a plurality of fluid treatment programs, including one fluid treatment program conforming to said predetermined program, and for thereafter performing said at least one other operational program; and control means adapted to be disposed in operative relation with said indicating means when said cassette is received in said apparatus for controlling said selectively operable means so as to perform only said one fluid treatment program of said plurality of said fluid treatment programs when said indicating means provides said given electrical condition and to perform said at least one other operational program when said indicating means provides an open circuit.

7. A photographic system comprising:

a cassette comprising:

a cassette housing configured for retaining a strip of exposed photographic film;

processing means within said cassette housing for treating such film with processing fluid so as to develop such film to a viewable condition when said cassette is operated in accordance with a given fluid treatment program;

means for indicating said given fluid treatment program; and apparatus comprising:

means for receiving said cassette;

means for operating said cassette through a first predetermined fluid treatment program conforming to said given program and alternately through at least a second predetermined fluid treatment program differing from said first program; and means responsive to said indicating means when said cassette is positioned in said receiving means for selecting said first program so as to operate said cassette through said given fluid treatment program.

8. The system of claim 7 wherein said processing means of said cassette includes means for treating progressive incremental sections of such film strip with such processing fluid during advancement of such film strip at a given speed, said means for operating said cassette through said programs includes drive means configured for cooperating with said cassette for advancing such film strip and means for controlling said drive means so as to advance such film at said given speed during said first program and at a second predetermined speed during said second program.

9. The system of claim 7 wherein said processing means includes means for treating progressive incremental sections of such film strip with said processing fluid during advancement of such film strip, said given fluid treatment program including interruption of such film advancement for a given time interval, and said means for operating said cassette through said programs includes drive means for configured for cooperating with said cassette for advancing such film strip during said first or said second fluid treatment program and means for controlling said drive means so as to provide a first interruption conforming to said given time interval during said first fluid treatment program and a second interruption for a time interval differing from said given time interval during said second program.

* * * * *